J. J. YUNCKER.
FRUIT-DRIER.

No. 173,099. Patented Feb. 1, 1876.

Witnesses:
Ruth K. Abbott
Andrew Choffin

John J. Yuncker, Inventor
by J. O. Abbott, Attorney

UNITED STATES PATENT OFFICE.

JOHN JOSEPH YUNCKER, OF MANSFIELD, OHIO, ASSIGNOR TO HIMSELF, GEORGE W. SCOTT, AND CHARLES B. NORMAN, OF SAME PLACE.

IMPROVEMENT IN FRUIT-DRIERS.

Specification forming part of Letters Patent No. 173,099, dated February 1, 1876; application filed March 23, 1875.

*To all whom it may concern:*

Be it known that I, JOHN J. YUNCKER, of Mansfield, in the county of Richland and State of Ohio, have invented certain new and useful Improvements in Fruit-Driers, and that the following is a full, clear, and exact specification thereof, which will enable others skilled in the art to make and use the said invention.

My invention consists in an improved arrangement of the air-conducting passages of a fruit-drier, whereby a more rapid and complete drying of the fruit is effected, and in an improved manner of constructing the inner walls of the drier, so as to form ledges on which to place the fruit shelves or trays, as is hereinafter more fully shown.

Figure 2:
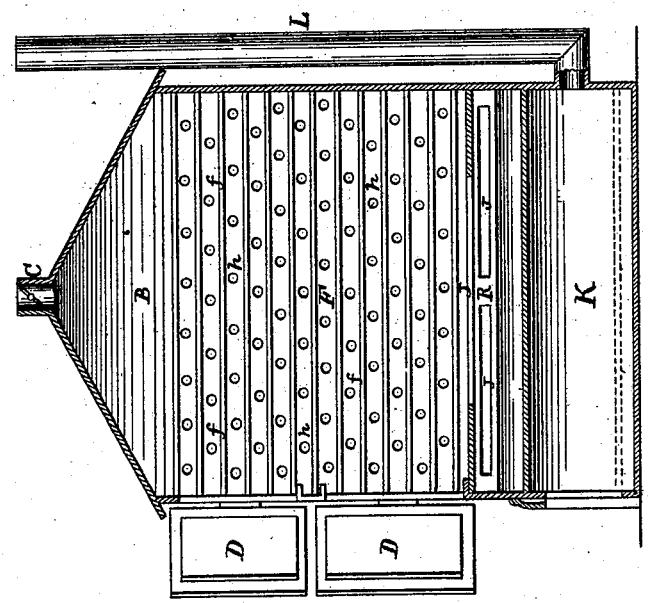
Figure 1:
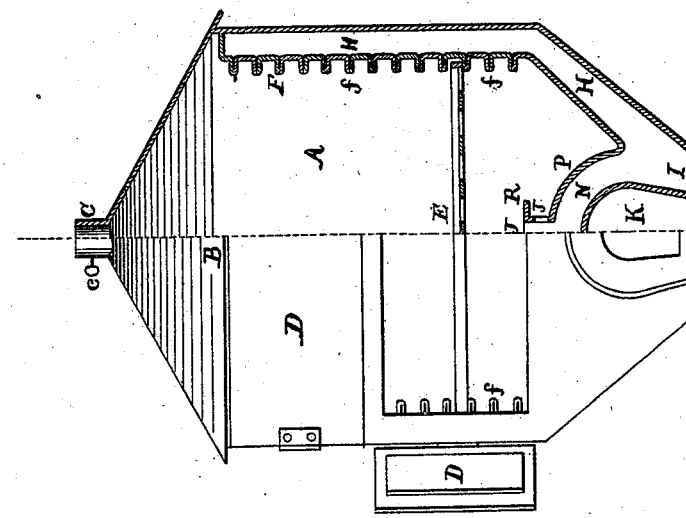

In the accompanying drawing, Figure 1 is an end view of my drier, with one-half of same shown in cross-section. Fig. 2 is a longitudinal section of the same.

A is the main body of the drier; B, the top or roof of the same; D D, doors at the end for the insertion or removal of the fruit-trays; K, the furnace in which is placed the heating-fuel, and L the pipe for carrying off the smoke. On the interior of the body A is placed the partition-wall F, which is joined at the top and ends to the body A in such a manner as to leave the passage H between the body and partitions, as shown in Fig. 1. The partition F extends down about to the middle of the furnace K, and from thence rises the partition P, which extends up over the furnace, and terminates in a T-shaped ridge, R, the arrangement being such as to leave the passage N over the furnace, which terminates in the space $u$ in the ridge. The inner wall F of the drier is formed of sheet metal, and in this are formed the corrugations or ledges $f$, which serve as supports for the shelves or trays E containing the fruit. Numerous holes, $h\ h$, are formed in the partition F between the $f$, and openings J J are also formed in the top and sides of the ridge R. The roof is surmounted by a ventilator, C, containing a damper, $c$, for regulating the draft through the drier. On heating the furnace K the outer air passes in at the openings I at the bottom of the drier, and is heated by contact with the furnace. The largest but least heated portion of air passes up the passages H and out through the holes $h$ over the fruit in the trays E, and, rising up through the trays, passes out through the ventilator C, while the more heated air passes up the passage N and up through the openings J, in the ridge R, and from thence up through the trays E to the ventilator C, the object of this arrangement being to obtain a center current of hot air to vaporize the fluids contained in the fruits, and an outer and abundant current of cooler air to carry off such vapor, and thus hasten the drying process. If it is desired to check the central warm current, a close partition-shelf can be placed on one of the lower ledges $f$, when the circulation will be confined to the passages H H and holes $h\ h\ h$.

What I claim as my invention, and desire to secure by Letters Patent, is—

1. A fruit-drier consisting of the body A, with furnace K and ventilator C, and provided with the inner walls F P, forming air-passages H H N at the sides of the body and over the furnace, said side passages being closed at the top, and having side openings $h\ h$, and said central passages terminating in the ridge R having openings J J, the several parts being arranged and combined substantially as and for the purpose specified.

2. The inner wall F of a fruit-drier made of sheet metal, and having the ledges or corrugations $f$ formed therein, substantially as and for the purpose specified.

As evidence of the foregoing witness my hand this 22d day of February, A. D. 1875.

JOHN JOSEPH YUNCKER.

Witnesses:
W. W. SMITH,
D. M. GEARY.